United States Patent
Suzuka

(10) Patent No.: US 9,755,773 B2
(45) Date of Patent: Sep. 5, 2017

(54) RECEIVING APPARATUS

(71) Applicant: FUNAI ELECTRIC CO., LTD., Osaka (JP)

(72) Inventor: Takuya Suzuka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 213 days.

(21) Appl. No.: 14/068,155

(22) Filed: Oct. 31, 2013

(65) Prior Publication Data

US 2014/0170964 A1 Jun. 19, 2014

(30) Foreign Application Priority Data

Dec. 13, 2012 (JP) .................................. 2012-272511

(51) Int. Cl.
| | |
|---|---|
| H04H 40/90 | (2008.01) |
| H04W 4/00 | (2009.01) |
| H04W 72/00 | (2009.01) |
| H04B 1/00 | (2006.01) |
| H04B 15/06 | (2006.01) |

(52) U.S. Cl.
CPC .......... *H04H 40/90* (2013.01); *H04B 1/0057* (2013.01); *H04B 15/06* (2013.01); *H04W 4/00* (2013.01); *H04W 72/00* (2013.01)

(58) Field of Classification Search
CPC ....... H04H 40/90; H04B 1/0057; H04B 15/06
See application file for complete search history.

(56) References Cited

U.S. PATENT DOCUMENTS

| | | | | |
|---|---|---|---|---|
| 5,742,208 A | * | 4/1998 | Blazo | H03B 29/00 327/156 |
| 7,079,195 B1 | * | 7/2006 | Birleson | H03D 7/161 348/725 |
| 7,425,995 B2 | * | 9/2008 | Johnson | H03C 3/403 348/725 |
| 7,502,587 B2 | * | 3/2009 | Petruzzelli | 455/3.02 |
| 8,132,214 B2 | * | 3/2012 | Petruzzelli | 725/68 |
| 2003/0220088 A1 | * | 11/2003 | Cowley et al. | 455/292 |
| 2006/0068708 A1 | * | 3/2006 | Dessert | H04B 15/06 455/63.1 |
| 2007/0032215 A1 | * | 2/2007 | Oba | H03F 1/0261 455/313 |

FOREIGN PATENT DOCUMENTS

| | | |
|---|---|---|
| JP | 2006-253885 A | 9/2006 |
| WO | 2008/148125 A1 | 12/2008 |

OTHER PUBLICATIONS

Extended European Search Report dated Apr. 11, 2014 for corresponding European application No. 13194219.5.

* cited by examiner

*Primary Examiner* — Yuwen Pan
*Assistant Examiner* — Zhitong Chen
(74) *Attorney, Agent, or Firm* — Morgan, Lewis & Bockius LLP

(57) ABSTRACT

A receiving apparatus comprises: a plurality of tuners; and a controller that controls a frequency of a local oscillation signal from each tuner such that a frequency of a synthetic signal generated by multiplying the local oscillation signals from the plurality of tuners by each other does not fall in a frequency band of a channel selected by each tuner. Deterioration in reception quality due to the multiplication of the local oscillation signals is prevented.

3 Claims, 6 Drawing Sheets

Fig.05

| BS BROADCAST | | CS BROADCAST | |
|---|---|---|---|
| CH NUMBER | CENTRAL FREQUENCY(MHz) | CH NUMBER | CENTRAL FREQUENCY(MHz) |
| BS1 | 1049.48 | ND2 | 1613 |
| BS3 | 1087.84 | ND4 | 1653 |
| BS5 | 1126.2 | ND6 | 1693 |
| BS7 | 1164.56 | ND8 | 1733 |
| BS9 | 1202.92 | ND10 | 1773 |
| BS11 | 1241.28 | ND12 | 1813 |
| BS13 | 1279.64 | ND14 | 1853 |
| BS15 | 1318 | ND16 | 1893 |
| BS17 | 1356.36 | ND18 | 1933 |
| BS19 | 1394.72 | ND20 | 1973 |
| BS21 | 1433.08 | ND22 | 2013 |

Fig.06

| COMBINATION | A | B | FREQUENCY OF SYNTHETIC SIGNAL | FORMULA |
|---|---|---|---|---|
| a | BS5(1126.2MHz) | ND6(1693MHz) | 1133.6MHz | (21) |
| b | BS9(1202.92MHz) | ND12(1813MHz) | 1220.16MHz | (21) |
| c | BS15(1318MHz) | ND20(1973MHz) | 1310MHz | (21) |
| d | BS1(1049.48)MHz | BS19(1394.72MHz) | 1408.48MHz | (22) |
| e | BS11(1241.28MHz) | ND4(1653MHz) | 1659.12MHz | (22) |

Fig.07

| COMBINATION | A | B | ABSOLUTE VALUE OF CONTROL VALUE (MHz) |
|---|---|---|---|
| a | BS5(1126.2MHz) | ND6(1693MHz) | 2.5 |
| b | BS9(1202.92MHz) | ND12(1813MHz) | 0.1 |
| c | BS15(1318MHz) | ND20(1973MHz) | 2.4 |
| d | BS1(1049.48)MHz | BS19(1394.72MHz) | 0.6 |
| e | BS11(1241.28MHz) | ND4(1653MHz) | 1.9 |

RECEIVING APPARATUS

INCORPORATION BY REFERENCE

This application is based on and claims the benefit of priority from Japanese Patent Application No. 2012-272511 filed on Dec. 13, 2012, the contents of which are hereby incorporated by reference.

BACKGROUND

Field of the Invention

The present invention relates to a receiving apparatus.

Description of Related Art

In recent years, receiving apparatuses, such as a television broadcast receiving apparatus and the like, capable of receiving satellite broadcast are widespread. A broadcast signal received by an antenna undergoes frequency conversion performed by a tuner. And the broadcast signal undergoing the frequency conversion performed by the tuner is demodulated by a demodulator.

In more detail, the tuner includes a local oscillator and a filter circuit. The broadcast signal (output signal from the antenna) is multiplied by a local oscillation signal output from the local oscillator and undergoes the frequency conversion to turn into a base band signal. The base band signal goes through the filter circuit to remove an unnecessary component and is output to the demodulator.

In the meantime, some receiving apparatuses include a plurality of tuners and each tuner obtains a broadcast signal. The local oscillator of each tuner includes an oscillation circuit that outputs an oscillation signal and the local oscillation signal is generated based on the oscillation signal output from the oscillation circuit. In this case, there is a case where the oscillation signal output from the oscillation circuit in a tuner and the oscillation signal output from the oscillation circuit in another tuner are multiplied by each other to generate a synthetic signal. There is a problem that the frequency of this synthetic signal falls in a frequency band of a selected channel by one tuner, whereby reception quality deteriorates.

SUMMARY OF THE INVENTION

JP-A-2006-253885 discloses that in a receiving apparatus incorporating a plurality of tuners, a local oscillation frequency is controlled such that the local oscillation frequency of another tuner and its high harmonic do not fall in a frequency band of a broadcast wave that is a selection target.

However, it is not considered at all that the frequency of a synthetic signal generated by multiplying oscillation signals output from the oscillation circuits of the plurality of tuners falls in a frequency band of a broadcast station that is a selection target.

In light of the above problem, it is an object of the present invention to provide a receiving apparatus that prevents deterioration in reception quality caused by the multiplication of oscillation signals.

To achieve the above object, a receiving apparatus according to the present invention includes: a plurality of tuners that multiply an output signal from an antenna by an oscillation signal or a signal obtained by applying frequency division to the oscillation signal, thereby performing frequency conversion; and a controller that controls a frequency of an oscillation signal from each tuner such that a frequency of a synthetic signal generated by multiplying oscillation signals from the plurality of tuners by each other does not fall in a frequency band of a channel selected by each tuner.

Besides, it is desirable that the receiving apparatus having the above structure includes a demodulator that demodulates the output signal that undergoes frequency conversion performed by the plurality of tuners, wherein the controller controls the frequency of the oscillation signal from each tuner based on a frequency range which the demodulator is able to demodulate.

Besides, in the receiving apparatus having the above structure, it is desirable that each channel includes: an oscillation circuit that generates an oscillation signal having a frequency which is constant-fold as high as a frequency in the frequency band of the selected channel; and a frequency divider that applies frequency division to the oscillation signal output from the oscillation circuit.

Besides, in the receiving apparatus having the above structure, it is desirable that the controller confirms beforehand a combination of channels which are selected by each tuner and have a frequency band in which the frequency of the synthetic signal, which is generated by multiplying the oscillation signals from the plurality of tuners by each other, falls; and calculates a control value for the frequency of the oscillation signal from each tuner.

Besides, in the receiving apparatus having the above structure, it is desirable that absolute values of the control values for the frequencies of the oscillation signal from the respective tuners are equal to each other.

Besides, in the receiving apparatus having the above structure, it is desirable that the frequency band of the channel selected by each tuner is calculated based on a frequency band width, an oscillation frequency of each tuner, and a frequency variation width of the output signal from the antenna.

According to the present invention, a frequency of a local oscillation signal from each tuner is controlled such that a frequency of a synthetic signal generated by multiplying oscillation signals from a plurality of tuners by each other does not fall in a frequency band of a channel selected by each tuner. Accordingly, deterioration in reception quality due to the multiplication of the local oscillation signals does not occur.

BRIEF DESCRIPTION OF THE DRAWINGS

FIG. 5 is a table showing selected channels for satellite broadcast in Japan and their central frequencies.

FIG. 6 is a table showing a combination of channels which are selected by a tuner and have a frequency band in which the frequency of a synthetic signal falls.

FIG. 7 is a table showing a corresponding relationship between a combination of channels and a control value.

DETAILED DESCRIPTION OF THE PREFERRED EMBODIMENTS

<First Embodiment>

Hereinafter, a receiving apparatus according to the present invention is described with reference to drawings. In the meantime, the embodiment described hereinafter shows an example of the receiving apparatus to embody a technological concept of the present invention, it is not meant that the present invention is limited to this receiving apparatus, but the present invention is also applicable equally to apparatuses according to other embodiments covered by the claims.

Figure 1:
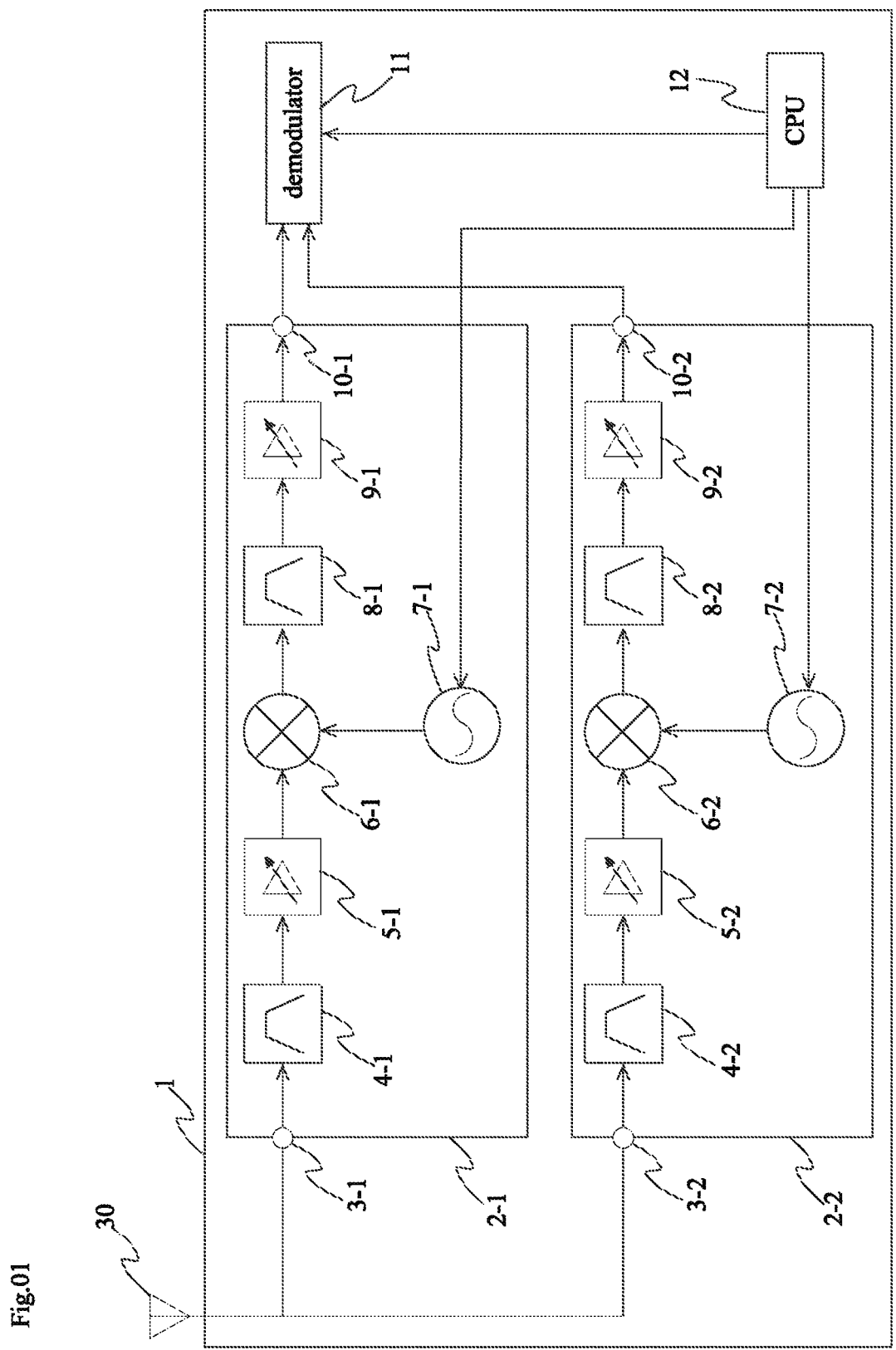
FIG. 1 is a diagram showing a structural example of a receiving apparatus.
Figure 2:
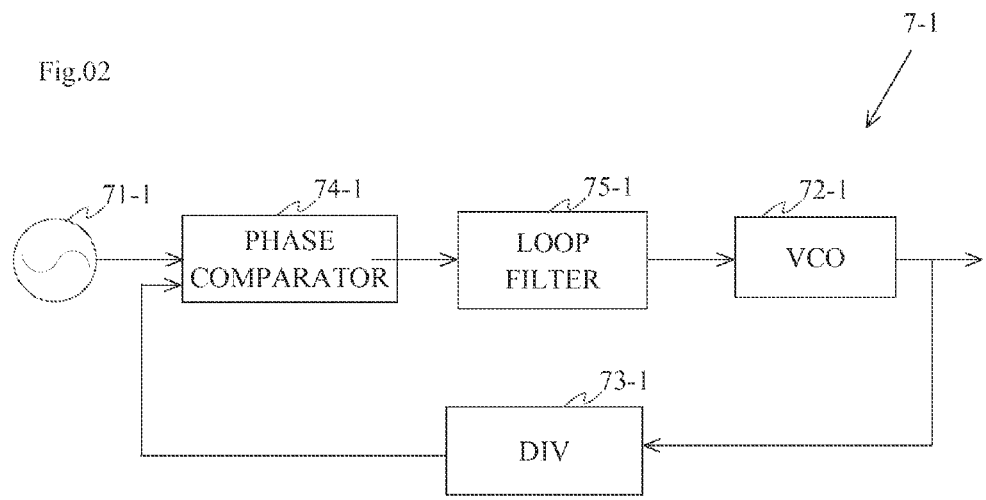
FIG. 2 is a diagram showing a first structural example of a local oscillator in FIG. 1.
Figure 3:
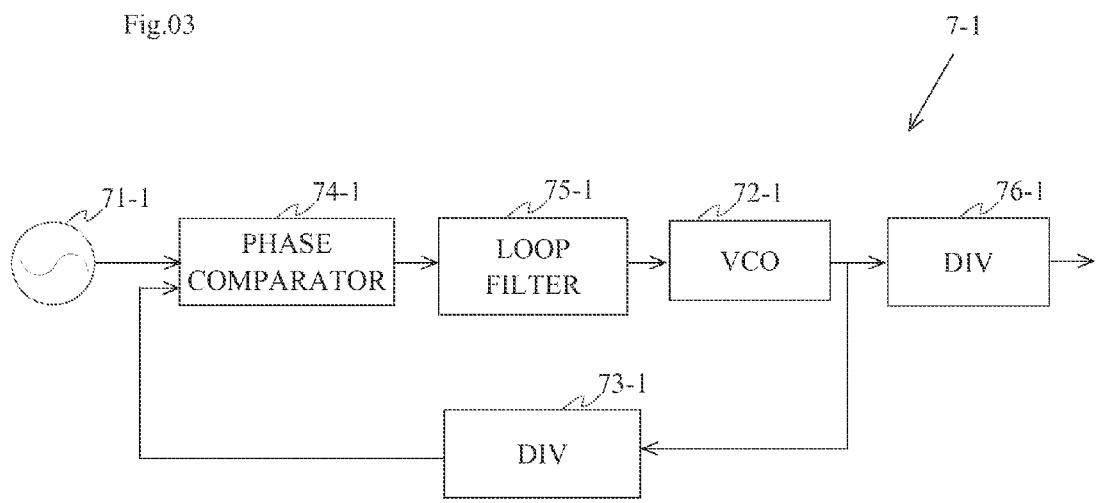
FIG. 3 is a diagram showing a second structural example of the local oscillator in FIG. 1.

FIG. 1 is a diagram showing a structural example of the receiving apparatus according to the present invention. FIG. 2 is a diagram showing a first example of a local oscillator in FIG. 1. FIG. 3 is a diagram showing a second example of the local oscillator in FIG. 1. In the present embodiment the receiving apparatus 1 includes two tuners 2-1, 2-2 (so-called double tuners). The tuners 2-1, 2-2 each obtain an output signal from an antenna 30 (hereinafter, there is a case where "the output signal from the antenna 30" is called a "broadcast signal"). And, the tuners 2-1, 2-2 multiply the broadcast signal by a local oscillation signal having a frequency that corresponds to a selected channel, thereby performing frequency conversion to obtain a base band signal.

In the following detailed description, the tuner 2-1 and the tuner 2-2 have the same structure; accordingly, the description is performed collectively about the tuner 2 without distinguishing the tuner 2-1 and the tuner 2-2 from each other. This also applies to components of the tuner 2. For example, the description is performed collectively about an input terminal 3 without distinguishing an input terminal 3-1 of the tuner 2-1 and an input terminal 3-2 of the tuner 2-2.

Tuner 2 includes: the input terminal 3; a first filter 4; a first variable gain device 5; a mixer 6; a local oscillator 7; a second filter 8; a second variable gain device 9; and an output terminal 10.

A broadcast signal received by the antenna 30 is input into the input terminal 3. The first filter 4 selects only a reception band (entire received broadcast frequency band) from the broadcast signal input into the input terminal and the other frequency components are removed. For example, when BS, satellite broadcast, is selected by a user, the frequency bands other than the satellite broadcast are removed.

An output signal from the first filter 4 is adjusted in gain by the first variable gain device 5. The mixer 6 multiplies an output signal from the first variable gain device 5 by a local oscillation signal (described in detail later) output from the local oscillator 7, thereby performing frequency conversion to obtain a base band signal.

The local oscillator 7 is described in detail with reference to FIG. 2 and FIG. 3. In the meantime, FIG. 2 and FIG. 3 show a structure of a local oscillator 7-1; however, a local oscillator 7-2 has the same structure. The local oscillator 7 shown in FIG. 2 and FIG. 3 includes: a reference signal generator 71; a Voltage Controlled Oscillator 72 (hereinafter also called a "VCO" or a "oscillation circuit"); a Divider (hereinafter also called "DIV") 73; a phase comparator 74; and a loop filter 75. Besides, the local oscillator 7 shown in FIG. 3 farther includes a frequency divider 76. The reference signal generator 71 generates and outputs a reference signal that has a predetermined constant frequency.

The VCO 72 generates and outputs an oscillation signal that has a frequency corresponding to a frequency control voltage. The DIV 73 applies frequency division, at a predetermined division ratio, to the oscillation signal output from the VCO 72. The division ratio at the DIV 73 is variable by a controller 12 described later. In other words, the DIV 73 is a variable frequency divider. If the division ratio is 1, the oscillation signal output from the VCO 72 and the oscillation signal undergoing the frequency division performed by the DIV 73 are the same as each other.

The phase comparator 74 compares the phase of the oscillation signal undergoing the frequency division performed by the DIV 73 and the phase of the reference signal output from the reference signal generator 71 with each other, thereby outputting a signal that indicates a phase difference. Based on the signal indicating the phase difference output from the phase comparator 74, the loop filter 75 outputs a D.C. frequency control voltage for controlling the VCO 72. And the VCO 72 outputs an oscillation signal that has a frequency corresponding to the frequency control voltage from the loop filter 75.

In FIG. 3, like the DIV 73, the frequency divider 76 applies frequency division, at a predetermined division ratio, to the oscillation signal output from the VCO 72. In other words, the oscillation signal output from the VCO 72 in FIG. 2 is output as a local oscillation signal from the local oscillator 7. In FIG. 3, a signal, which is obtained by applying the frequency division to the oscillation signal output from the VCO 72, is output as the local oscillation signal from the local oscillator 7.

The frequency of the oscillation signal generated by the VCO 72 is usually a frequency that is constant-fold as high as the central frequency of the selected channel. However, in the present embodiment, as described later, there is a case where the frequency of the oscillation signal is made to be a frequency that falls in the frequency band of the selected channel and is constant-fold as high as a frequency other than the central frequency.

In other words, in the present embodiment, the VCO 72 generates an oscillation signal that is constant-fold as high as a frequency (the central frequency or a frequency other than the central frequency) in the frequency band of the selected channel. According to this, compared with the case where the VCO 72 generates an oscillation signal that has a frequency corresponding to the selected channel, it is possible to curb the deterioration in reception quality of the selected channel due to the oscillation signal generated by the CVO 72.

In the meantime, in the present embodiment, a case where the above constant multiple is 2 or 4 is described as an example; however, the multiple is not limited to these. The local oscillator 7 in the case where the constant multiple is 2 or 4 has a structure shown in FIG. 3, and the description is performed based on the structure shown in FIG. 3 as the structure of the local oscillator 7 shown in FIG. 1.

The second filter 8 smooths the base band signal output from the mixer 6, that is, attenuates a high-frequency component and outputs it. The output signal from the second filter 8 is adjusted in gain by the second variable gain device 9. The output signal from the second variable gain device 9 is output from the output terminal 10 to the demodulator 11.

The demodulator 11 applies a demodulation process to the output signal from the output terminal 10 to output a demodulated signal.

The controller (CPU) 12 is a controller that controls the entire receiving apparatus 1. Especially, in the present embodiment, the controller 12 controls the frequency of the oscillation signal generated by the VCO 72. Specifically, as described above, the controller 12 controls the case where the VCO 72 generates an oscillation signal having a frequency that is constant-fold as high as the central frequency of the selected channel and the case where the VCO 72 generates an oscillation signal having a frequency that is constant-fold as high as a frequency which is obtained by adding or subtracting a control value described later to or from the central frequency of the selected channel.

When performing the control, the controller 12 sets the control value such that the frequency obtained by adding or subtracting the control value to or from the central frequency of the selected channel becomes a frequency that falls in the frequency band of the selected channel. According to this, by multiplying the broadcast signal by local oscillation signal output from the local oscillator 7, it is possible to perform the frequency conversion to obtain the base band signal.

Figure 4:
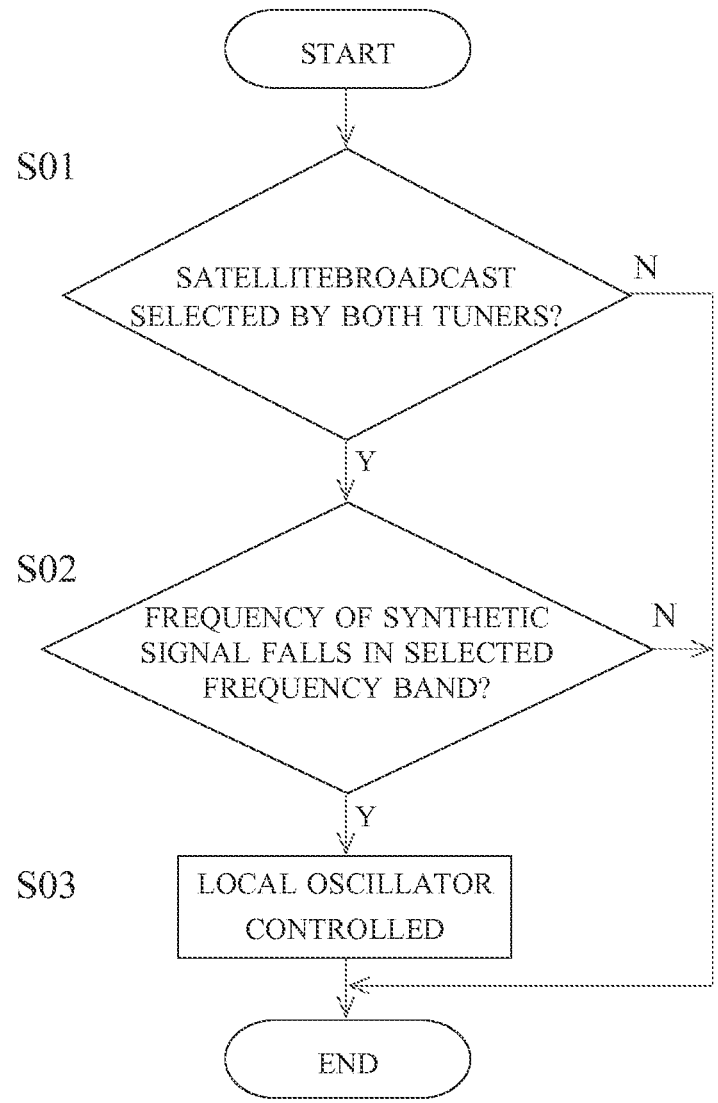
FIG. 4 is a flow chart showing a process that a controller of a receiving apparatus executes.

As described above, the receiving apparatus 1 needs to generate an oscillation signal to apply the frequency conversion to a broadcast signal to obtain a base band signal. And when selection is performed by both tuners 2-1, 2-2, oscillation signals are generated by the VCOs 72-1, 72-2 of both tuners 2-1, 2-2, and both oscillation signals are secondarily multiplied by each other to generate a synthetic signal. There is a case where this synthetic signal incurs deterioration in reception quality. Because of this, the controller 12 controls the VCOs 72-1, 72-2 such that the synthetic signal does not incur the deterioration in the reception quality. FIG. 4 is a flow chart showing a process that the controller 12 of the receiving apparatus 1 according to the present embodiment executes.

In a step S01, the controller 12 determines whether both tuners (tuners 2-1, 2-2) are selecting satellite broadcast or not. The satellite broadcast is a broadcast that is performed by using a broadcast satellite or a communication satellite, to which the BS broadcast and CS broadcast correspond in Japan.

If both tuners select satellite broadcast (Y in the step S01), the process goes to a step S02, and if both tuners do not select satellite broadcast (N in the step S01), the process is ended.

In the step S02, when the VCO 7201 of the local oscillator 7-1 and the VCO 72-2 of the local oscillator 7-2 generate an oscillation signal having a frequency that is constant-fold as high as the central frequency of the selected channel, the controller 12 determines whether the frequency of a synthetic signal of both oscillation signals falls in a frequency band of the selected channel by the tuner 2-1 or the tuner 2-2 or not.

When the frequency of the synthetic signal falls in the frequency band of the selected channel by one tuner 2 (Y in the step S02), the process goes to a step S03, where when the frequency of the synthetic signal does not fall in the frequency band of any selected channel by the tuner 2 (N in the step S02), the process is ended.

Hereinafter, the case where the frequency of the synthetic signal falls in the frequency band of the selected channel by the tuner 2-1 or the tuner 2-2 is described in detail. FIG. 5 is a table showing selected channels for satellite broadcasts in Japan and their central frequencies. The central frequency interval of the BS broadcast is 38.36 MHz, while the central frequency interval of the CS broadcast is 40 MHz. Besides, the frequency band width is a range of ±17.25 MHz from the central frequency.

The controller 12 calculates the frequency of the synthetic signal generated by multiplying the oscillation signals by each other. As described above, the VCOs 72-1, 72-2 generate an oscillation signal having a frequency that is 2-fold or 4-fold as high as the central frequency of the selected channel, and the frequency of the synthetic signal is calculated.

When the central frequency of the selected channel by the tuner 2-1 is A and the central frequency of the selected channel by the tuner 2-1 is B, the frequency of the synthetic signal is given by one of the following formulas. In the meantime, A<B is assumed.

$$2 \times B - 2 \times A \qquad \text{formula (1)}$$

$$4 \times A - 2 \times B \qquad \text{formula (2)}$$

$$4 \times B - 2 \times A \qquad \text{formula (3)}$$

$$4 \times B - 4 \times A \qquad \text{formula (4)}$$

And when the frequency calculated by each formula falls in the frequency band (range of the central frequency ±17.25) of the selected channel, reception deterioration is likely to occur. In other words, in a case where the following formulas are satisfied, the reception deterioration is likely to occur. In the meantime, description is skipped, but the left sides and right sides of the following formulas (5) to (22) have a unit of [MHz].

$$2 \times B - 2 \times A = A \pm 17.25 \qquad \text{formula (5)}$$

$$2 \times B - 2 \times A = B \pm 17.25 \qquad \text{formula (6)}$$

$$4 \times A - 2 \times B = A \pm 17.25 \qquad \text{formula (7)}$$

$$4 \times A - 2 \times B = B \pm 17.25 \qquad \text{formula (8)}$$

$$4 \times B - 2 \times A = A \pm 17.25 \qquad \text{formula (9)}$$

$$4 \times B - 2 \times A = B \pm 17.25 \qquad \text{formula (10)}$$

$$4 \times B - 4 \times A = A \pm 17.25 \qquad \text{formula (11)}$$

$$4 \times B - 4 \times A = B \pm 17.25 \qquad \text{formula (12)}$$

In the meantime, the symbol "±" indicates an error range in the above or following formulas, and for example, in the formula (5), "2×B−2×A=A±17.25" means "−17.25≤(2×B−2×A)−A≤17.25."

The formulas (5) to (12) are expanded to be the following formulas, respectively. The following formulas (13) to (20) correspond to the formulas (5) to (12), respectively.

$$B = A \times 3/2 \pm 17.25/2 \qquad \text{formula (13)}$$

$$B = 2 \times A \pm 17.25/2 \qquad \text{formula (14)}$$

$$B = A \times 3/2 \pm 17.25/2 \qquad \text{formula (15)}$$

$$B = A \times 4/3 \pm 17.25/3 \qquad \text{formula (16)}$$

$$B = A \times 3/4 \pm 17.25/4 \qquad \text{formula (17)}$$

$$B = A \times 2/3 \pm 17.25/3 \qquad \text{formula (18)}$$

$$B = A \times 5/4 \pm 17.25/4 \qquad \text{formula (19)}$$

$$B = A \times 4/3 \pm 17.25/3 \qquad \text{formula (20)}$$

As described above, A<B; therefore the formula (17) and the formula (18) are not satisfied. Besides, if each central frequency shown in FIG. 5 is substituted, the formula (14) and the formula (19) are not satisfied. Accordingly, there are two following formulas that are satisfied.

$$B = A \times 3/2 \pm 17.25/2 \qquad \text{formula (21)}$$

$$B = A \times 4/3 \pm 17.25/3 \qquad \text{formula (22)}$$

FIG. 6 is a table showing a combination of channels which satisfy the formula (21) to the formula (22). As shown in FIG. 6, when the combination of the selected channels by the tuners 2-1 and 2-2 is a to e, the reception quality is likely to deteriorate. In other words, when the combination of the selected channels by the tuners 2-1 and 2-2 is a to e, the controller 12 determines that the frequency of the synthetic signal falls in the frequency band of the selected channel by one tuner 2 and goes to a step S03.

In the step S03, the controller 12 controls the local oscillators 7-1, 7-2 to control the frequency of the oscillation signal generated by the VCOs 72-1, 72-2. Specifically, the frequencies of the oscillation signals generated by the VCOs 72-1, 72-2 are controlled (changed) such that the frequency of the synthetic signal of the oscillation signals generated by the VCOs 72-1, 72-2 falls outside the frequency band of the selected channel.

The changed frequency of the oscillation signal is a frequency that is in the frequency band of the selected channel and 2-fold or 4-fold as high as a frequency other than the central frequency. And the oscillation signal undergoing the frequency division performed by the frequency divider 76 is output as a local oscillation signal from the local oscillator 7. The local oscillation signal output from the local oscillator 7 is multiplied by the broadcast signal and undergoes the frequency conversion to turn into the base band signal.

Accordingly, the frequency of the baseband signal in the case where the frequency is controlled has an error from the central frequency of the selected channel. This error can be modulated by the demodulator 11, but it is conceivable that as the error becomes large, the demodulation takes a long time and becomes difficult. Accordingly, it is desirable to make the error as small as possible. For example, in a case where a demodulator capable of demodulating an error in a range of the central frequency ±7 MHz is used as the demodulator 11, it is desirable that the error is made equal to or lower than 7 MHz and made as small as possible.

As indicated by the formula (1) and the like, the frequency of the synthetic signal becomes large or small in proportion to a difference between the frequency B and the frequency A. In other words, if the variation value of the frequency of the synthetic signal is made small, it is possible to make the error between the frequency of the base band signal and the frequency of the central signal small. Hereinafter, specific control methods are described for the respective combinations a to e shown in FIG. 6.

<Control Method in Case of Combination A>

In the combination a, the frequency of the synthetic signal rails in a frequency band of the BS5. Accordingly, the controller 12 controls the local oscillation frequencies of the VCOs 72-1, 72-2 such that the frequency of the synthetic signal falls outside the frequency band of the BS5.

The frequency of the synthetic signal is 1133.6 MHz and is higher than the central frequency (1126.2 MHz) of the BS5. In other words, the variation value of the frequency of the synthetic signal is minimum when the frequency of the synthetic signal is the minimum frequency of frequencies larger than 1143.45 MHz that is an upper limit value of the frequency band of the BS5.

The difference between the upper limit value of the frequency band of the BS5 and the frequency of the synthetic signal is 9.85 MHz. The frequency of the synthetic signal in the combination a is calculated by the formula (1). In the formula (1), both the frequencies A and B are doubled. Accordingly, when the frequency A after the control is A' and the frequency B after the control is B', to make the frequency of the synthetic signal larger than 1143.45 MHz, it is required to meet (B'-A')-(B-A)>9.85/2.

Besides, in the formula (1), the frequency A is multiplied by a negative number and the frequency B is multiplied by a positive number; therefore, when a control value A1 (A'-A) of the frequency A is a negative value and a control value B1 (B'-B) of the frequency B is a positive value, the error between the frequency of the base band signal and the central frequency of the BS5 and ND6 becomes minimum.

From the above description, when the following formulas (23) to (24) are satisfied and the absolute value of the control value is made as small as possible (e.g., the control value A1=−2.5 MHz, the control value B1=2.5 MHz), it is possible to make the error between the frequency of the base band signal and the central frequency of the selected channel minimum and to curb the deterioration in the reception quality.

The control value $A1 < -9.85/4$ formula (23)

The control value $B1 > 9.85/4$ formula (24)

<Control Method in Case of Combination B>

In the combination b, the frequency of the synthetic signal falls in a frequency band of the BS9. Accordingly, the controller 12 controls the local oscillation frequencies of the VCOs 72-1, 72-2 such that the frequency of the synthetic signal falls outside the frequency band of the BS9.

The frequency of the synthetic signal is 1220.16 MHz and is higher than the central frequency (1202.92 MHz) of the BS9. In other words, the variation value of the frequency of the synthetic signal is minimum when the frequency of the synthetic signal is the minimum frequency of frequencies larger than 1220.17 MHz that is an upper limit value of the frequency band of the BS9.

The difference between the upper limit value of the frequency band of the BS9 and the frequency of the synthetic signal is 0.01 MHz. The frequency of the synthetic signal in the combination b is calculated by the formula (1). In the formula (1), both the frequencies A and B are doubled. Accordingly, when the frequency A after the control is A' and the frequency B after the control is B', to make the frequency of the synthetic signal larger than 1220.17 MHz, it is required to meet (B'-A')-(B-A)>0.01/2.

Besides, in the formula (1), the frequency A is multiplied by a negative number and the frequency B is multiplied by a positive number; therefore, when the control value A1 (A'-A) of the frequency A is a negative value and the control value B1 (B'-B) of the frequency B is a positive value, the error between the frequency of the base band signal and the central frequency of the BS9 and ND12 becomes minimum.

From the above description, when the following formulas (25) to (26) are satisfied and the absolute value of the control value is made as small as possible (e.g., the control value A1=−0.1 MHz, the control value B1=0.1 MHz), it is possible to make the error between the frequency of the base band signal and the central frequency of the selected channel minimum and to curb the deterioration in the reception quality.

The control value $A1 < -0.01/4$ formula (25)

The control value $B1 > 0.01/4$ formula (26)

<Control Method in Case of Combination C>

In the combination c, the frequency of the synthetic signal falls in a frequency band of the BS15. Accordingly, the controller 12 controls the local oscillation frequencies of the VCOs 72-1, 72-2 such that the frequency of the synthetic signal falls outside the frequency band of the BS15.

The frequency of the synthetic signal is 1310 MHz and is lower than the central frequency (1318 MHz) of the BS15. In other words, the variation value of the frequency of the synthetic signal is minimum when the frequency of the synthetic signal is the maximum frequency of frequencies smaller than 1300.75 MHz that is a lower limit value of the frequency band of the BS15.

The difference between the lower limit value of the frequency band of the BS15 and the frequency of the synthetic signal is 9.25 MHz. The frequency of the synthetic signal in the combination c is calculated by the formula (1). In the formula (1), both the frequencies A and B are doubled. Accordingly, when the frequency A after the control is A' and the frequency B after the control is B', to make the frequency of the synthetic signal larger than 1300.75 MHz, it is required to meet (B'−A')−(B−A)>−9.25/2.

Besides, in the formula (1), the frequency A is multiplied by a negative number and the frequency B is multiplied by a positive number; therefore, when the control value A1 (A'−A) of the frequency A is a positive value and the control value B1 (B'−B) of the frequency B is a negative value, the error between the frequency of the base band signal and the central frequency of the BS15 and ND20 becomes minimum.

From the above description, when the following formulas (27) to (28) are satisfied and the absolute value of the control value is made as small as possible (e.g., the control value A1=2.4 MHz, the control value B1=−2.4 MHz), it is possible to make the error between the frequency of the base band signal and the central frequency of the selected channel minimum and to curb the deterioration in the reception quality.

$$\text{The control value } A1 > 9.25/4 \quad \text{formula (27)}$$

$$\text{The control value } B1 < -9.25/4 \quad \text{formula (28)}$$

<Control Method in Case of Combination D>

In the combination d, the frequency of the synthetic signal falls in a frequency band of the BS19. Accordingly, the controller 12 controls the local oscillation frequencies of the VCOs 72-1, 72-2 such that the frequency of the synthetic signal falls outside the frequency band of the BS19.

The frequency of the synthetic signal is 1408.48 MHz and is higher than the central frequency (1394.72 MHz) of the BS19. In other words, the variation value of the frequency of the synthetic signal is minimum when the frequency of the synthetic signal is the minimum frequency of frequencies larger than 1411.97 MHz that is an upper limit value of the frequency band of the BS19.

The difference between a lower limit value of the frequency band of the BS15 and the frequency of toe synthetic signal is 3.49 MHz. The frequency of the synthetic signal in the combination d is calculated by the formula (4). In the formula (4), the frequency A is multiplied by a positive number and the frequency B is multiplied by a negative number; therefore, the control value A1 (A'−A) of the frequency A is made to be a positive value and the control value B1 (B'−B) of the frequency B is made to be a negative value.

Besides, in the formula (1), the frequency A is multiplied by 4 and the frequency B is multiplied by 2. Accordingly, when ½× the absolute value of the control value A1=the absolute value of the control value B1 in accordance with the multiple, the error between the frequency of the base band signal and the central frequency of the BS1 and BS19 becomes minimum.

From the above description, when the following formulas (29) to (30) are satisfied and the absolute value of the control value is made as small as possible (e.g., the control value A1=0.6 MHz, the control value B1=0.6 MHz), it is possible to make the error between the frequency of the base band signal and the central frequency of the selected channel minimum and to curb the deterioration in the reception quality.

$$\text{The control value } A1 > 3.49/6 \quad \text{formula (29)}$$

$$\text{The control value } B1 < -3.49/6 \quad \text{formula (30)}$$

<Control Method in Case of Combination E>

In the combination e, the frequency of the synthetic signal falls in a frequency band of the ND4. Accordingly, the controller 12 controls the local oscillation frequencies of the VCOs 72-1, 72-2 such that the frequency of the synthetic signal falls outside the frequency band of the ND4.

The frequency of the synthetic signal is 1659.12 MHz and is higher than the central frequency (1653 MHz) of the ND4. In other words, the variation value of the frequency of the synthetic signal is minimum when the frequency of the synthetic signal is the minimum frequency of frequencies larger than 1670.25 MHz that is an upper limit value of the frequency band of the ND4.

The difference between a lower limit value of the frequency band of the ND4 and the frequency of the synthetic signal is 11.13 MHz. The frequency of the synthetic signal in the combination e is calculated by the formula (4). In the formula (4), the frequency A is multiplied by a positive number and the frequency B is multiplied by a negative number; therefore, the control value A1 (A'−A) of the frequency A is made to be a positive value and the control value B1 (B'−B) of the frequency B is made to be a negative value.

Besides, in the formula (1), the frequency A is multiplied by 4 and the frequency B is multiplied by 2. Accordingly, when ½× the absolute value of the control value A1=the absolute value of the control value B1 in accordance with the multiple, the error between the frequency of the base band signal and the central frequency of the BS11 and ND4 becomes minimum.

From the above description, when the following formulas (31) to (32) are satisfied and the absolute value of the control value is made as small as possible (e.g., the control value A1=1.9 MHz, the control value B1=1.9 MHz), it is possible to make the error between the frequency of the base band signal and the central frequency of the selected channel minimum and to curb the deterioration in the reception quality.

$$\text{The control value } A1 > 11.13/6 \quad \text{formula (31)}$$

$$\text{The control value } B1 < -11.13/6 \quad \text{formula (32)}$$

According to the present embodiment, the receiving apparatus includes: the plurality of tuners that multiply an output signal from the antenna by an oscillation signal or a signal obtained by applying the frequency division to the oscillation signal, thereby performing the frequency conversion; and the controller that controls the frequency of the oscillation signal from each tuner such that the frequency of a synthetic signal generated by multiplying the oscillation signals from the plurality of tuners by each other does not fall in the frequency band of a channel selected by each tuner. In other words, the frequency of the oscillation signal from each tuner is controlled such that the frequency of the synthetic signal generated by multiplying the oscillation signals from the plurality of tuners does not fall in the frequency band of a broadcast signal obtained by each tuner. Accordingly, the deterioration in the reception quality is not caused by the multiplication of the oscillation frequencies.

Besides, the receiving apparatus includes the demodulator that demodulates the broadcast signal that undergoes the frequency conversion performed by the plurality of tuners, and when controlling the frequency of the local oscillation signal from each tuner, the controller controls the frequency based on the range of frequencies that the demodulator can demodulate. Accordingly, impossible demodulation is not incurred by the controller controlling the frequency of the local oscillation signal from the tuner.

Besides, each tuner includes: the oscillation circuit that generates an oscillation signal having a frequency that is constant-fold as high as a frequency in the frequency band of the selected channel; and the frequency divider that applies the frequency division to the oscillation signal output from the oscillation circuit. In the case of controlling the oscillation signal, the controller makes the voltage control oscillator generate an oscillation signal having a frequency that is constant-fold as high as a frequency that is obtained by adding a control value to a frequency in the frequency band of the selected channel. Accordingly, even if the control value is made relatively small, the control value is multiplied by a constant value; therefore the frequency of the oscillation signal changes relatively large.

The oscillation signal undergoes the frequency division performed by the frequency divider and is used as the local oscillation signal by which the broadcast signal is multiplied; however, as described above, it is possible to make the control value relatively small; accordingly, the error between the base band signal and the central frequency of the selected channel becomes small. Therefore, it is possible to sufficiently perform the control of the oscillation signal in the range of frequencies that the demodulator can demodulate.

Besides, the controller confirms beforehand the combination of channels which are selected by each tuner and have the frequency band in which the frequency of the synthetic signal, which is generated by multiplying the oscillation signals from the plurality of tuners by each other, falls; and calculates the control value for the frequency of the oscillation signal from each tuner. In other words, by preparing beforehand the table that relates the combination of channels and the control value to each other, it is possible to control the frequency of the oscillation signal at an early time by only referring to the table.

Besides, in the case of controlling the frequency of the oscillation signal from each tuner, the controller equalizes the absolute values of the control values for the frequencies of the oscillation signals from the respective tuners to each other. According to this, when the demodulator demodulates the base band signal, it is possible to demodulate the base band signal output from any tuner with the same demodulation time and demodulation accuracy.

<Supplementary Descriptions>

Each control described above is performed such that the absolute value of the control value A1 of the frequency A and the absolute value of the control value B1 of the frequency B become equal to each other. By performing such control, it is possible to prevent the absolute value of one control value from becoming larger than the absolute value of the other control value and to demodulate in the same way the base band signal output from any tuner 2.

However, this is not limiting, but the absolute value of the one control value may be made smaller or larger than the absolute value of the other control value. For example, when the selected channel by the tuner 2-1 is not recorded but the selected channel by the tuner 2-2 is recorded, the error between the base band signal from the tuner 2-1, which is highly likely to undergo zapping, and the central frequency of the selected channel may be made smaller than the error between the base band signal from the tuner 2-2 and the central frequency of the selected channel.

In the above embodiment, the controller 12 determines in the step S02 whether the frequency of the synthetic signal falls in the frequency band of the selected channel by the one tuner 2 or not, and calculates the control value in the step S03; however, a combination of channels, which are selected by the one tuner 2 and have a frequency band in which the frequency of the synthetic signal falls, may be confirmed beforehand, and the control values for the frequencies of the oscillation signals from both tuners 2 may be calculated beforehand.

In other words, by preparing the table shown in FIG. 7 that relates the combinations of channels and the control values to each other, and in a case where a combination of selected channels corresponds to any one of the combinations of channels shown in FIG. 7, by identifying a control value based on the combination, the frequencies of the oscillation signals from both tuners 2 may be controlled. According to this structure, it is not necessary to calculate the frequency of the synthetic signal and the control value each time a channel is selected; accordingly, it is possible to perform the control at an early time.

Besides, in the above embodiment, the case where the receiving apparatus 1 includes the double tuner is described as an example; however, this is not limiting, but the receiving apparatus may include three or more tuners. For example, in the case where three tuners are included, in a case where the frequency of a synthetic signal, which is synthesized from a synthetic signal of oscillation signals from a first tuner and a second tuner and an oscillation signal from a third tuner, falls in the frequency band of a selected channel by a tuner, the frequency of the oscillation signal may be controlled.

Besides, in each embodiment described above, each formula is satisfied on the assumption that the oscillation frequency of the tuner and the frequency of an output signal, which is output from the antenna and input into the tuner, are frequencies that are stable and desired. However, as a matter of fact, it must be considered that the oscillation frequency of the tuner and the output signal frequency foam the antenna have somewhat a frequency variation width because of influence of a tolerance and a temperature drift of each of the tuner and the antenna.

For example, it is assumed that the local oscillator, which generates the oscillation frequency of the tuner, has a variation width of ±50 ppm including a tolerance and a temperature drift. Besides, the frequency of the output signal from the antenna is required by the standards to have a variation width of ±1.5 MHz in the case of the satellite broadcast in Japan. Here, when this tuner selects the ND24 ch. (2053 MHz), the oscillation frequency of the tuner has a variation width of ±0.10265 MHz (because 50 ppm of 2053 MHz is 0.10265 MHz) for 2053 MHz. On the other hand, the frequency of the antenna1 output signal also has a variation width of up to ±1.5 MHz; accordingly, in this case, it is sayable that there is a case where if the local oscillation frequency is not deviated considering a variation width of ±1.60265 MHz obtained by adding both variation widths to each other, an expected effect is not obtained.

In the above formulas (5) to (12), the frequency band of ±17.25 MHz is considered: however, the calculation is performed using a frequency band of ±18.85265 MHz. In the meantime, the calculation result is not shown because it is easy to obtain like in the above example. In the meantime, the ND24 ch. is the maximum frequency that the tuner can select; accordingly, the oscillation frequency variation of the tuner becomes maximum at the time of selecting the ND24 ch. Therefore, the calculation result obtained by using the maximum variation width at the time of selecting the ND24 ch. gives a sufficient effect even at a time of selecting any channel other than the ND24 ch.

What is claimed is:

1. A receiving apparatus comprising:
    a first tuner that performs frequency conversion by multiplying an output signal from an antenna by a first oscillation signal or a signal obtained by applying frequency division to the first oscillation signal;
    a second tuner that performs frequency conversion by multiplying the output signal by a second oscillation signal or a signal obtained by applying frequency division to the second oscillation signal;
    a controller that controls frequencies of the first and second oscillation signals to prevent a frequency of a synthetic signal based on the first and second oscillation signals from falling in frequency bands of channels selected by the first and second tuners; and
    a demodulator that demodulates signals resulting from frequency conversion of the output signal from the antenna by the first and second tuners respectively,
    wherein errors of frequencies of the signals resulting from frequency conversion by the first and second tuners under control of the controller from central frequencies of the respective selected channels are smaller than a frequency range which the demodulator is able to demodulate,
    wherein the controller confirms a combination of channels which are selected by the first and second tuners and have a frequency band in which the frequency of the synthetic signal, which is generated based on the first and second oscillation signals, falls; and calculates control values for the frequencies of the first and second oscillation signals, and
    wherein absolute values of the control values for the frequencies of the first and second oscillation signals are approximately equal to each other.

2. The receiving apparatus according to claim 1, wherein the first tuner includes
    a first oscillation circuit that generates the first oscillation signal with a frequency that is a constant-value multiple of a frequency within the frequency band of the channel selected by the first tuner and
    a first frequency divider that applies frequency division to the first oscillation signal output from the first oscillation circuit, and
    the second tuner includes
    a second oscillation circuit that generates the second oscillation signal with a frequency that is a constant-value multiple of a frequency within the frequency band of the channel selected by the second tuner and
    a second frequency divider that applies frequency division to the second oscillation signal output from the second oscillation circuit.

3. The receiving apparatus according to claim 1, wherein the frequency bands of the channels selected by the first and second tuners are calculated based on a frequency band width and based on frequency variation widths of oscillation frequencies of the first and second tuners and of the output signal from the antenna.

* * * * *